(12) United States Patent
Wilks

(10) Patent No.: US 6,846,388 B2
(45) Date of Patent: Jan. 25, 2005

(54) APPARATUS FOR AND METHOD OF HEATING FLUID AND DISTILLING FLUID

(76) Inventor: Freeman Wilks, P.O. Box 450675, Ft. Lauderdale, FL (US) 33345

( * ) Notice: Subject to any disclaimer, the term of this patent is extended or adjusted under 35 U.S.C. 154(b) by 34 days.

(21) Appl. No.: 10/011,715

(22) Filed: Dec. 11, 2001

(65) Prior Publication Data

US 2003/0155226 A9 Aug. 21, 2003

Related U.S. Application Data

(60) Provisional application No. 60/254,585, filed on Dec. 12, 2000.

(51) Int. Cl.⁷ .............................. B01D 3/02; B01D 3/42
(52) U.S. Cl. ................. 202/176; 126/232; 159/46; 202/181; 202/193; 202/196; 219/220; 392/393
(58) Field of Search .................. 202/176, 167, 202/180, 239, 181, 185.5, 185.6, 192, 193, 194, 195, 196; 159/44, DIG. 1, 46, 23, 38; 392/307, 342, 386, 393; 219/601, 220; 126/232

(56) References Cited

U.S. PATENT DOCUMENTS

| | | | |
|---|---|---|---|
| 3,597,138 A | * | 8/1971 | Ray ............................ 431/54 |
| 3,907,683 A | * | 9/1975 | Gilmont ..................... 202/177 |
| 3,912,598 A | * | 10/1975 | Dick ........................ 202/185.1 |
| 4,096,039 A | * | 6/1978 | Carnine et al. ............. 202/205 |
| 4,339,307 A | * | 7/1982 | Ellis, Jr. .................... 202/176 |
| 4,622,102 A | | 11/1986 | Diebel |
| 4,690,102 A | * | 9/1987 | Sundquist ................... 202/166 |
| 5,290,402 A | | 3/1994 | Tsai |
| 5,348,623 A | * | 9/1994 | Salmon ......................... 203/1 |
| 5,447,125 A | * | 9/1995 | McNally et al. ........... 122/14.1 |
| 5,464,531 A | | 11/1995 | Greene |
| 5,662,779 A | | 9/1997 | Greene |

* cited by examiner

Primary Examiner—Virginia Manoharan
(74) Attorney, Agent, or Firm—Dykema Gossett PLLC

(57) ABSTRACT

A method and an apparatus for heating fluid with a gas heater and distilling fluid with the pilot light of the gas heater are disclosed. The apparatus for heating fluid and distilling fluid includes a main tank for containing fluid to be heated, a heater, adapted to have a pilot light, for heating the fluid in said main tank and an evaporator tank for vaporizing fluid received therein with heat from the pilot light. The method of heating fluid and distilling fluid includes heating a first volume of fluid with a heater having a pilot light and heating a second volume of fluid with the pilot light. A second apparatus for heating fluid and distilling fluid includes a main tank for containing fluid to be heated, a condensing tank adapted to pass fluid to said main tank, an evaporator tank for vaporizing fluid received therein, a condensing coil, disposed in said condensing tank, for exchanging heat between fluid vaporized by said evaporator tank and fluid in said condensing tank, a distillate tank adapted to receive condensed fluid from said condensing coil and an electric filament for heating fluid in said evaporator tank when a level in said distillate tank equals or exceeds a predetermined level.

5 Claims, 2 Drawing Sheets

APPARATUS FOR AND METHOD OF HEATING FLUID AND DISTILLING FLUID

CROSS-REFERENCE TO RELATED APPLICATION

This Application incorporates and claims the benefit of U.S. Provisional Application No. 60/254,585, filed Dec. 12, 2000, by Freeman Wilks, entitled *Method and Apparatus for Providing Both Heated and Distilled Water.*

BACKGROUND OF THE INVENTION

The present invention is directed to a method and device for heating water, e.g., for household use, and for concurrently providing distilled water, e.g., for drinking (a thermostil). In the device, the energy used to distill water is then used to heat water in, say, a water heater, thus providing a very economical technique for obtaining clean drinking water. Currently, the cost of distilled water for drinking purposes or other forms of human consumption is uneconomical.

Some techniques or apparatuses have been proposed for economical drinking water distillation. One apparatus includes a water heater and distiller apparatus in which condensing steam in the distilling portion of the apparatus gives up its latent heat to water which is being heated in the water heating portion of the apparatus. However, the devices promote the use of separate or auxiliary heating elements and controlling energizing thereof based on an amount of fluid in a boiler, rather than exploiting the constant source of energy provided by a pilot light and controlling the amount of fluid to be evaporated thereby according to the amount of fluid in the boiler or amount of fluid recovered in a distillate tank. See, for example, U.S. Pat. No. 4,690,102, issued Sep. 1, 1987, to G. Sundquist, for *Water Heater and Distiller Apparatus* and U.S. Pat. No. 5,304,286, issued Apr. 19, 1994, to D. G. Palmer, entitled *Water Supply System.*

Another device includes a feed water intake which provides water in excess of the distilled water output, a heater controlling the quantity of water boiled, a waste water exit port to remove accumulated water above a certain level, a distilled water exit port in the vapor space, a condensing device to transfer the heat of condensation to a hot water tank and a waste water heat exchange device to transfer heat from a waste water to the hot water tank. See, for example, U.S. Pat. No. 4,601,789, issued Jul. 22, 1986, to J. G. Bjorklund entitled *Water Purification Apparatus.*

What are needed, and not taught or suggested in the art, are an apparatus for and a method of heating fluid with a gas heater and distilling fluid with the pilot light of the gas heater, and an apparatus for heating fluid with a gas heater and distilling fluid with an electric filament.

SUMMARY OF THE INVENTION

The invention provides a method and an apparatus for heating fluid with a gas heater and distilling fluid with the pilot light of the gas heater. The apparatus for heating fluid and distilling fluid includes a main tank for containing fluid to be heated, a heater, adapted to have a pilot light, for heating the fluid in said main tank and an evaporator tank for vaporizing fluid received therein with heat from the pilot light. The method of heating fluid and distilling fluid includes heating a first volume of fluid with a heater having a pilot light and heating a second volume of fluid with the pilot light.

The invention provides improved elements and arrangements thereof, for the purposes described, which are inexpensive, dependable and effective in accomplishing intended purposes of the invention. Other features and advantages of the present invention will become apparent from the following description of the preferred embodiments which refers to the accompanying drawing.

BRIEF DESCRIPTION OF THE DRAWINGS

The invention is described in detail below with reference to the following figures, throughout which similar reference characters denote corresponding features consistently throughout, wherein.

DETAILED DESCRIPTION OF THE PREFERRED EMBODIMENTS

Figure 1:
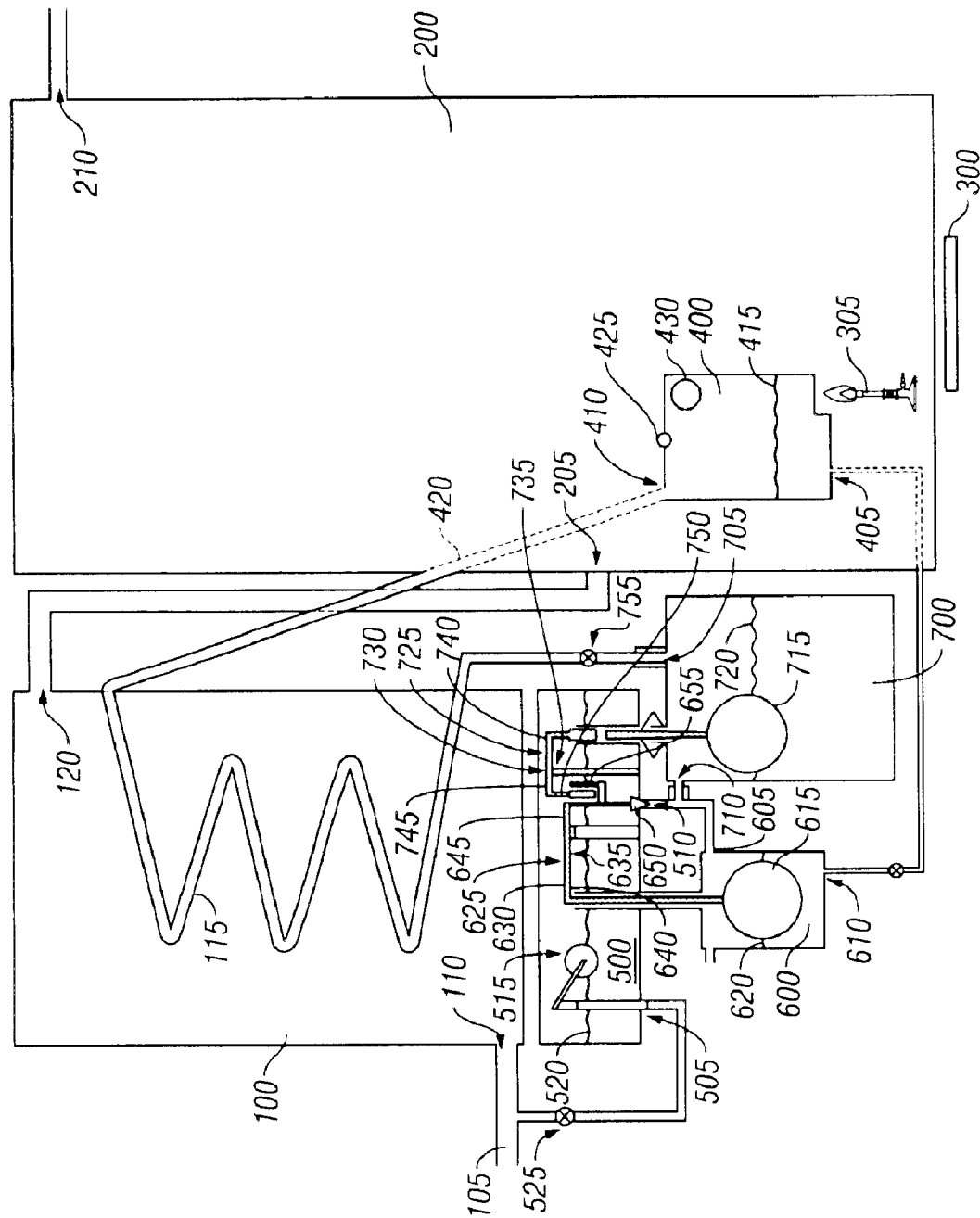
FIG. 1 is a schematic view of an embodiment according to principles of the invention.

The invention is a method and an apparatus for providing heated and distilled fluid. Referring to FIG. 1, the apparatus includes a condensing tank 100, for receiving fluid and condensing an evaporated fluid therewith, a main tank 200, for receiving and heating condensing fluid from condensing tank 100, a heater 300, having a pilot light 305, for heating fluid in main tank 200, an evaporator 400, for vaporizing fluid received therein with heat from pilot light 305, a holding tank 500, for supplying fluid to evaporator 400, a delaying float bowl tank 600, for regulating fluid flow from holding tank 500 to evaporator 400, and a distillate tank 700, for receiving condensate from the vaporized fluid.

Condensing tank 100 receives fluid from a main supply 105 at an inlet 110. Fluid from inlet 105 passes up through condensing tank 100, across a condensing coil 115 disposed therein, and passes out of condensing tank 100 via outlet 120. Condensing coil 115 exchanges heat between vaporized fluid passing through condensing coil 115 and fluid received in condensing tank 100, as described below.

According to natural physical law, heated portions of the fluid in condensing tank 100 rise relative to cooler portions thereof. Accordingly, outlet 120 is vertically superior to inlet 110 to exploit this natural physical law and pass heated fluid from condensing tank 100 to main tank 200, thereby conserving energy by reducing the amount of heat needed to heat fluid in main tank 200.

Main tank 200 receives fluid from condensing tank 100 via inlet 205. Heated fluid is drawn from main tank 200 for ordinary home usage via outlet 210. Similar to condensing tank 100, outlet 210 is vertically superior to inlet 205 so that the hottest fluid is drawn from main tank 200.

Heater 300 is arranged relative to main tank 200 to heat fluid therein in a conventional manner. Heater 300 may be fueled by any energy source, such as oil, gas or solid fuel, so long as heater 300 has a pilot light 305 for igniting same for intermittent, controlled burning and heating of the fluid. In this embodiment, a heater having an electronic starter or igniting element may not be substituted for heater 300 because the invention exploits heat thrown by pilot light 305, as discussed below. An alternative embodiment, discussed below, substitutes an electric element for pilot light 305.

Holding tank 500 receives fluid from main supply 105 at an inlet 505. Fluid passes from holding tank 500 via outlet 510. A float switch 515 monitors or corresponds to and regulates the amount of fluid received in holding tank 500. When the fluid level 520 in holding tank 500 falls below a predetermined level, float switch 515 influences a valve (not shown) to open, permitting fluid from main supply 105 to enter holding tank 500. When fluid level 520 reaches or exceeds the predetermined level, float switch 515 influences the valve (not shown) to close, prohibiting fluid from main supply 105 from entering holding tank 500.

A valve 525 regulates fluid communication between main supply 105 and holding tank 500. Valve 525 may prohibit flow to holding tank 500, for example, to enable installation, maintenance, repair, replacement, etc. thereof or other downstream structures.

Delaying float bowl tank 600 receives fluid from holding tank 500 via inlet 605. Fluid passes from delaying float bowl tank 600 via outlet 610. A float 615 monitors or corresponds to the level 620 of fluid in delaying float bowl tank 600. Float 615 influences a first fluid flow regulator 625 which regulates fluid flow into delaying float bowl tank 600. First fluid flow regulator 625 effectively limits the fluid level 415 in evaporator 400 according to the fluid level 620 in delaying float bowl tank 600.

An embodiment of first fluid flow regulator 625 includes a lever 630 connected to or responsive to a position of float 615. Lever 630 may have a first arm 640 that pivots about pivot point 635. A second arm 645 extending from pivot point 635 may be connected to a stopper 650 or influence the operation of a valve (not shown). In operation, when float 615 urges lever 630 to pivot, lever 630 urges stopper 650 from or into outlet 510 of holding tank 500, thereby respectively permitting or prohibiting flow into delaying float bowl tank 600.

Evaporator 400 receives fluid from delaying float bowl tank 600 via inlet 405. Fluid passes from evaporator 400 via outlet 410. Fluid level 415 in evaporator 400 corresponds to level 620 in delaying float bowl tank 600.

Pilot light 305 is arranged relative to evaporator 400 to heat fluid therein in a conventional manner. As is conventional to many gas applications, pilot light 305 burns continuously, barring interrupted gas service, malfunction or other unanticipated phenomena. Consequently, pilot light 305 provides a continuous source of heat for heating fluid in evaporator 400, which otherwise goes untapped.

Fluid in evaporator 400 is continuously heated by pilot light 305 such that some of fluid evaporates. The vaporous evaporated fluid passes from evaporator 400, via outlet 410, into conduit 420. Preferably, conduit 420 is insulated. Vaporized fluid from conduit 420 passes into condensing coil 115.

As is well known, the process of heating a liquid until the liquid transforms into a gaseous state and/or heating a gas increases pressure. Accordingly, as is common to boilers of many applications, to prevent dangers that could arise due to unregulated pressure buildup, evaporator 400 has a valve 425 to prevent pressurization within evaporator 400 above a predetermined pressure.

When evaporator 400 is not in service, to prevent vapor lock and/or dangerous accumulation of undesirable gases, evaporator 400 has a vent 430 which is opened to vent evaporator 400. Vent 430 is closed when evaporator 400 is in service to avoid wasteful escape of vaporized fluid.

As mentioned above, vaporized fluid passing through condensing coil 115 exchanges or transfers the latent heat of condensation to, thereby heating, fluid received in condensing tank 100. Fluid condensed in coil 115, under the influence of gravity, passes to distillate tank 700.

Distillate tank 700 receives fluid from condensing coil 115 through an inlet 705. Distilled fluid is drawn from distillate tank 700 via an outlet which may feed a tap (not shown). A float 715 monitors or corresponds to the level 720 of fluid in distillate tank 700. Float 715 influences a second fluid flow regulator 725, which influences first fluid flow regulator 625, which in turn regulates fluid flow into delaying float bowl tank 600, as described above. As a safeguard, an overflow outlet 710 draws fluid from distillate tank 700 to holding tank 600 when the level 715 of fluid in distillate tank 700 rises to or beyond a predetermined level. Second fluid flow regulator 725 effectively limits fluid level 415 in evaporator 400 according to the fluid level 715 in distillate tank 700.

An embodiment of second fluid flow regulator 725 includes a lever 730 connected to or responsive to a position of float 715. Lever 730 may have a first arm 740 that pivots about pivot point 735. A second arm 745 extending from pivot point 735 may have an extension 750 received in a cup 655 or other structure that may be influenced by arm 745 or extension 750. In operation, when float 715 urges lever 730 to pivot, lever 730 urges first fluid flow regulator 625 to urge stopper 650 into outlet 510 of holding tank 500, thereby prohibiting flow into delaying float bowl tank 600, or allows first fluid flow regulator 625 to operate unencumbered.

A valve 755 regulates fluid communication between condensing coil 115 and distillate tank 700. Valve 755 may prohibit flow to distillate tank 700, for example, to enable installation, maintenance, repair, replacement, etc. thereof or other downstream structures.

Figure 2:
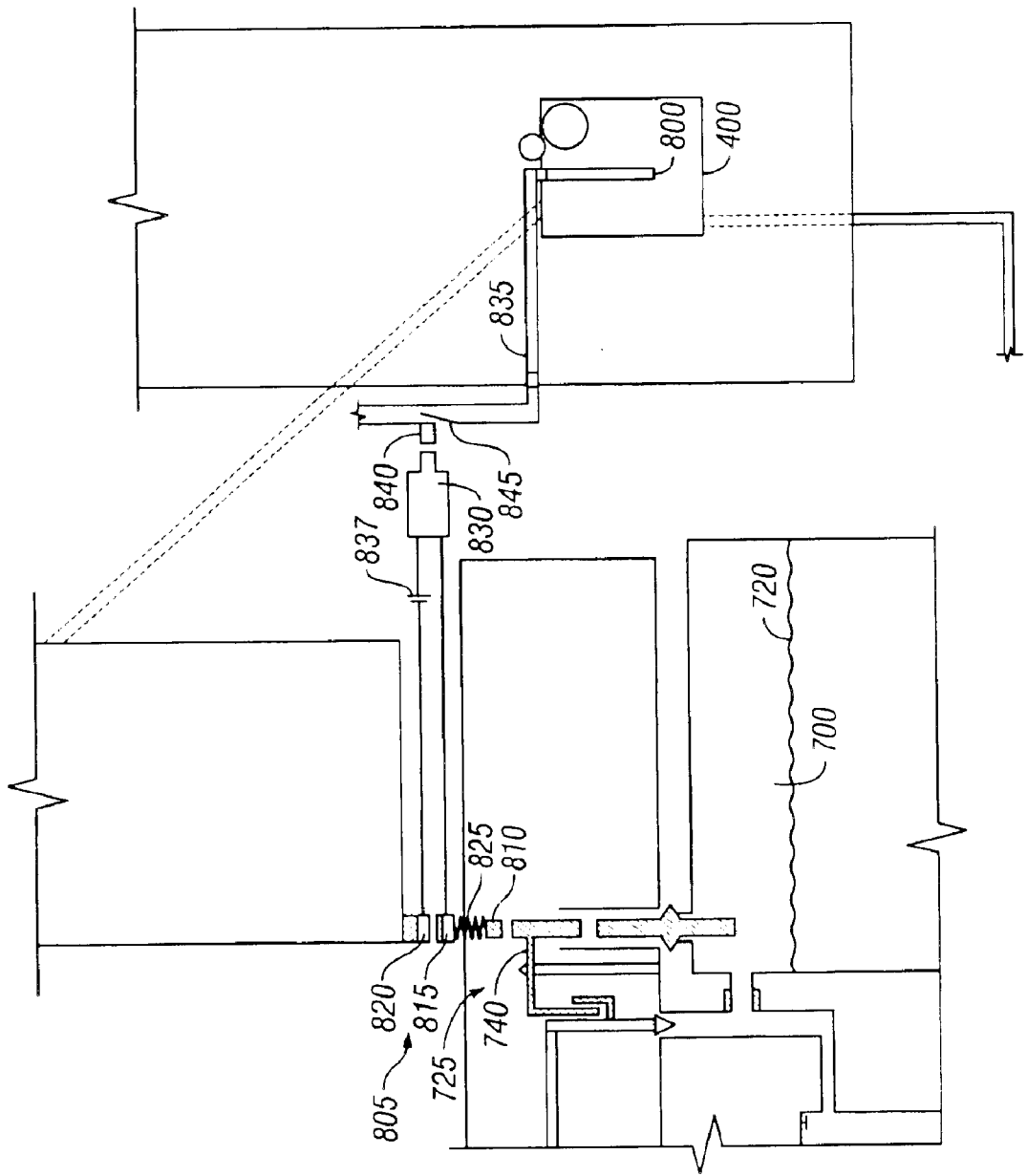
FIG. 2 is a schematic view of another embodiment according to principles of the invention.

FIG. 2 shows an alternative embodiment of the invention. Rather than pilot light 305, as shown in FIG. 1, this embodiment employs an electric filament 800 disposed, as a heat source for heating fluid, in evaporator 400. Electric filament 800 provides about the same power as pilot light 305.

Rather than being a constant heat source, electric filament 800 is energized when the fluid level in distillate tank 700 reaches a predetermined level. To this end, for example, when fluid in distillate tank 700 attains the level 720, flow regulator 725 causes switch 805 to close, thereby energizing a solenoid 830, which closes a circuit 835 for energizing electric filament 800.

More specifically, fluid level in distillate tank 700 influences flow regulator 725, as described above. First arm 740 of lever 730 of flow regulator 725 drives a pin 810 against a first contact 815 to overcome a bias with respect to, for making contact with a second contact 820. A spring 825 may be interposed between pin 810 and first contact 815.

When switch 805 is closed, energy from a direct current source 837 is directed to contact solenoid 830. Solenoid 830 drives a third contact 840 to overcome a bias with respect to, for making contact with a fourth contact 845, thereby closing circuit 835.

Although the invention has been described in relation to particular embodiments thereof, many other variations and modifications and other uses will become apparent to those skilled in the art. The invention is not limited by the specific disclosure herein, but only by the appended claims.

I claim:

1. Apparatus for heating fluid and distilling fluid comprising:
    a main tank for containing fluid to be heated by means of a main gas heater including a pilot light for heating said main tank;
    a condensing tank for passing fluid to said main tank;
    an evaporator tank for vaporizing fluid received therein and being heated by means of said pilot light;

a condensing coil, disposed in said condensing tank, for exchanging heat between fluid vaporized by said evaporator tank and fluid in said condensing tank; and a distillate tank for receiving condensed fluid from said condensing coil;

wherein said pilot light heats fluid in said evaporator tank when a level in said distillate tank equals or exceeds a predetermined level for thereby substantially continuously allowing fluid in said evaporator tank to be heated and vaporized for providing distilled fluid and further substantially continuously allowing fluid in said main tank to be heated by serving as a substantially constant source of energy for igniting gas for said main gas heater, said apparatus further comprising a first fluid flow regulator for regulating fluid flow to said evaporator tank according to an amount of fluid in a delaying float bowl tank, and a second fluid flow regulator for regulating fluid flow to said evaporator tank according to an amount of fluid in said distillate tank.

2. Apparatus of claim 1, wherein said second fluid flow regulator comprises:

a float for monitoring or corresponding to an amount of fluid in said distillate tank; and a lever having a first arm and a second arm defined by a pivot point, a distal end of said first arm for influencing said second fluid flow regulator;

wherein said float is responsive to a fluid level in said distillate tank and influences said lever which, when the fluid level in said distillate tank equals or exceeds a predetermined level, influences said second fluid flow regulator, and, when the fluid level in said distillate tank is less than a predetermined level, does not influence said second fluid flow regulator.

3. Apparatus of claim 1, wherein said first fluid flow regulator comprises:

a float for monitoring or corresponding to an amount of fluid in said delaying float bowl tank; and a lever having a first arm and a second arm defined by a pivot point, a distal end of said first arm connected to said float and a distal end of said second arm connected to a stopper for permitting or prohibiting flow to said delaying float bowl tank;

wherein said float is responsive to a fluid level in said delaying float bowl tank and influences said lever which correspondingly influences a position of said stopper.

4. Apparatus of claim 1, further comprising a selectably actuable vent, for preventing vapor lock and/or dangerous accumulation of undesirable gases when said evaporator tank is not in service, which may be closed when said evaporator tank is in service.

5. Apparatus of claim 1, further comprising an overflow outlet for withdrawing fluid from said distillate tank when a fluid level therein equals or exceeds a predetermined level.

\* \* \* \* \*